(12) United States Patent
Tabata et al.

(10) Patent No.: US 10,020,020 B2
(45) Date of Patent: Jul. 10, 2018

(54) SWITCHING PERIOD CONTROL OF MICROWAVE ASSISTED MAGNETIC RECORDING FOR POLE ERASURE SUPPRESSION

(71) Applicant: Western Digital Technologies, Inc., Irvine, CA (US)

(72) Inventors: Satoshi Tabata, Chigaski (JP); Atsushi Yamada, Odawara (JP); Michiya Kazusawa, Fujisawa (JP); Masato Shiimoto, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/788,173

(22) Filed: Oct. 19, 2017

(65) Prior Publication Data
US 2018/0061450 A1 Mar. 1, 2018

Related U.S. Application Data

(62) Division of application No. 14/950,938, filed on Nov. 24, 2015, now Pat. No. 9,799,369.

(51) Int. Cl.
| | |
|---|---|
| *G11B 20/10* | (2006.01) |
| *G11B 5/127* | (2006.01) |
| *G11B 5/235* | (2006.01) |
| *G11B 5/31* | (2006.01) |
| *G11B 5/00* | (2006.01) |

(52) U.S. Cl.
CPC ...... *G11B 20/10009* (2013.01); *G11B 5/1278* (2013.01); *G11B 5/235* (2013.01); *G11B 5/3153* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 7,372,653 | B2 | 5/2008 | Suzuki et al. |
| 7,460,324 | B2 | 12/2008 | Ohinata et al. |
| 8,570,684 | B1 | 10/2013 | Contreras et al. |
| 8,582,239 | B2 | 11/2013 | Soeno et al. |
| 8,737,006 | B2 | 5/2014 | Livshitz et al. |
| 8,773,817 | B2 | 7/2014 | Mazur et al. |
| 9,007,723 | B1 | 4/2015 | Igarashi et al. |
| 2013/0083423 | A1 | 4/2013 | Shiroishi et al. |

(Continued)

OTHER PUBLICATIONS

Livshitz, et al., "Degaussing of Write Heads in Perpendicular Magnetic Recording," IEEE Transactions on Magnetics, vol. 47, No. 10, Oct. 2011, pp. 3403-3406.

(Continued)

*Primary Examiner* — Craig A. Renner
(74) *Attorney, Agent, or Firm* — Foley & Lardner LLP

(57) ABSTRACT

A magnetic recording system for preventing data loss resulting magnetic oscillator current. The magnetic recording system includes a magnetic write head with a magnetic write pole, a magnetic oscillator near the magnetic write pole, and a write coil for magnetizing the write pole. Circuitry is connected with the magnetic write coil to supply a current to the write coil and connected with the magnetic oscillator to supply a current to the magnetic oscillator. The circuitry is configured to ensure that the current to the magnetic oscillator does not inadvertently magnetize the write pole after the magnetic write pole has demagnetized.

9 Claims, 12 Drawing Sheets

(56) References Cited

U.S. PATENT DOCUMENTS

2013/0229895 A1   9/2013  Shiroishi et al.
2013/0279039 A1  10/2013  Shiroishi
2013/0335847 A1  12/2013  Shiroishi
2014/0347969 A1  11/2014  Nishida et al.

OTHER PUBLICATIONS

Non-Final Rejection Office Action on U.S. Appl. No. 14/950,938 dated Dec. 7, 2016.
U.S. Notice of Allowance on U.S. Appl. No. 14/950,938 dated Jun. 23, 2017.

SWITCHING PERIOD CONTROL OF MICROWAVE ASSISTED MAGNETIC RECORDING FOR POLE ERASURE SUPPRESSION

CROSS-REFERENCE TO RELATED PATENT APPLICATION

This application is a divisional of U.S. application Ser. No. 14/950,938, filed on Nov. 24, 2015, the entirety of which is incorporated by reference herein.

FIELD

The present invention relates to magnetic data recording, and more particularly to a method for reducing magnetic write pole erasure by controlling a switching period of a magnetic oscillator relative to the write pole.

BACKGROUND

At the heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When current flows through the coil, a resulting magnetic field causes a magnetic flux to flow through the coil, which results in a magnetic write field emitting from the tip of the write pole. This magnetic field is sufficiently strong that it locally magnetizes a portion of the adjacent magnetic media, thereby recording a bit of data. The write field then travels through a magnetically soft under-layer of the magnetic medium to return to the return pole of the write head.

A magnetoresistive sensor such as a Giant Magnetoresistive (GMR) sensor or a Tunnel Junction Magnetoresistive (TMR) sensor can be employed to read a magnetic signal from the magnetic media. The magnetoresistive sensor has an electrical resistance that changes in response to an external magnetic field. This change in electrical resistance can be detected by processing circuitry in order to read magnetic data from the magnetic media.

The extremely small magnetic bit sizes necessary to achieve very high data density inherently lead to instability, such as thermal instability. Very small, closely packed magnetic grains are inherently magnetically unstable, even at room temperature and especially at elevated temperatures. One way to increase data density without loss of data is by making the magnetic media highly anisotropic. This makes the data more thermally stable, but also makes it harder to record to, especially with the very small write pole necessary for recording very small data bits. This challenge can be overcome however, through the use of microwave assisted magnetic recording, wherein a magnetic oscillator generates an oscillating magnetic field at a location near the write pole. This oscillating magnetic field magnetically excites the media in a manner that makes it temporarily easier to write to.

SUMMARY

The present invention provides a magnetic recording system that prevents magnetic oscillator current from inadvertently magnetizing a write pole after writing has been terminated, thereby preventing data loss. The system includes a magnetic write pole, a write coil configured to magnetize the magnetic write pole, and a magnetic oscillator formed adjacent to the magnetic write pole, the magnetic oscillator is configured to cause an oscillating magnetic field. Circuitry is connected to the write coil and the magnetic oscillator that is configured to ensure that current flow through the write coil does not lead to data loss by magnetizing the write pole after writing has terminated.

One way in which this can be accomplished is to shorten the amount of time that the electrical current through the magnetic oscillator ramps down so that current through the magnetic oscillators completely terminates before the write pole has finished degaussing (demagnetizing). Another way in which this might be accomplished is by extending the time it takes for the write pole to degauss so that, again, the current flow through the magnetic oscillator has terminated before the write pole has degaussed. This prevention of data loss can also be accomplished by driving an alternating electrical current through the magnetic oscillator when the magnetic oscillator is deactivated.

This advantageously prevents magnetic field from the magnetic oscillator current from inadvertently magnetizing the write pole after writing has been terminated. Such magnetization of the write pole would otherwise result in the loss of previously recorded data.

In addition, when microwave assisted recording has been performed for a sufficiently long time, the magnetic field from the magnetic oscillator can magnetize the write pole during writing to such an extent that the write pole remains magnetized after writing has terminated. This can be avoided by de-activating the magnetic oscillator while activating magnetic writing for a sufficient period of time with the magnetic oscillator off. This duration can be, for example, one complete rotation of the magnetic media. This method advantageously prevents data loss due to write pole erasure.

These and other features and advantages of the invention will be apparent upon reading of the following detailed description of the embodiments taken in conjunction with the figures in which like reference numeral indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
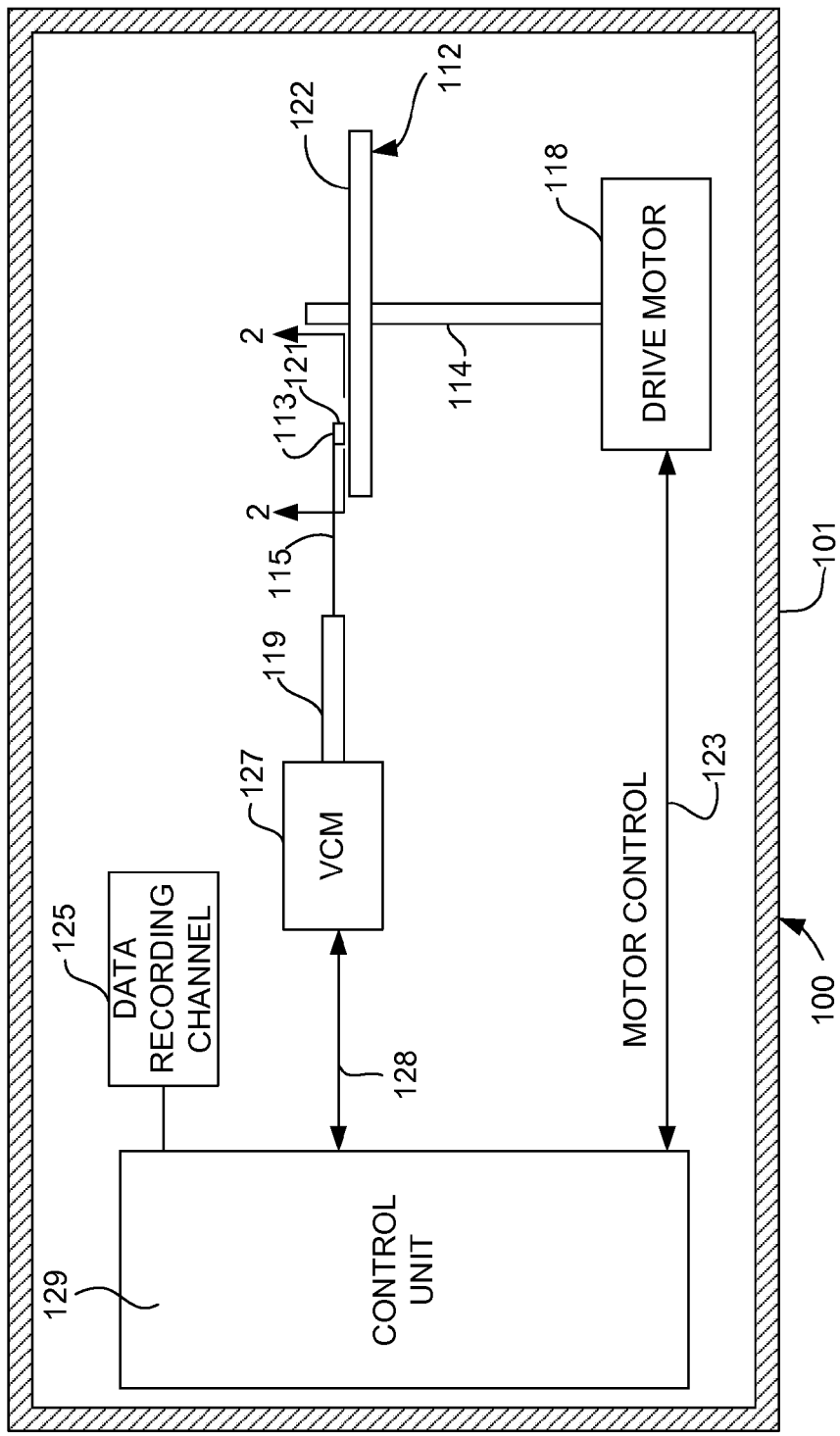
FIG. 1 is a schematic illustration of a disk drive system in which the invention might be embodied.

Referring now to FIG. 1, there is shown a disk drive 100. The disk drive 100 includes a housing 101. At least one rotatable magnetic disk 112 is supported on a spindle 114 and rotated by a disk drive motor 118. The magnetic recording on each disk may be in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by the controller 129.

During operation of the disk storage system, the rotation of the magnetic disk 112 generates an air bearing between the slider 113 and the disk surface 122, which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the media 112. Write and read signals are communicated to and from write and read heads 121 by way of recording channel 125.

Figure 2:
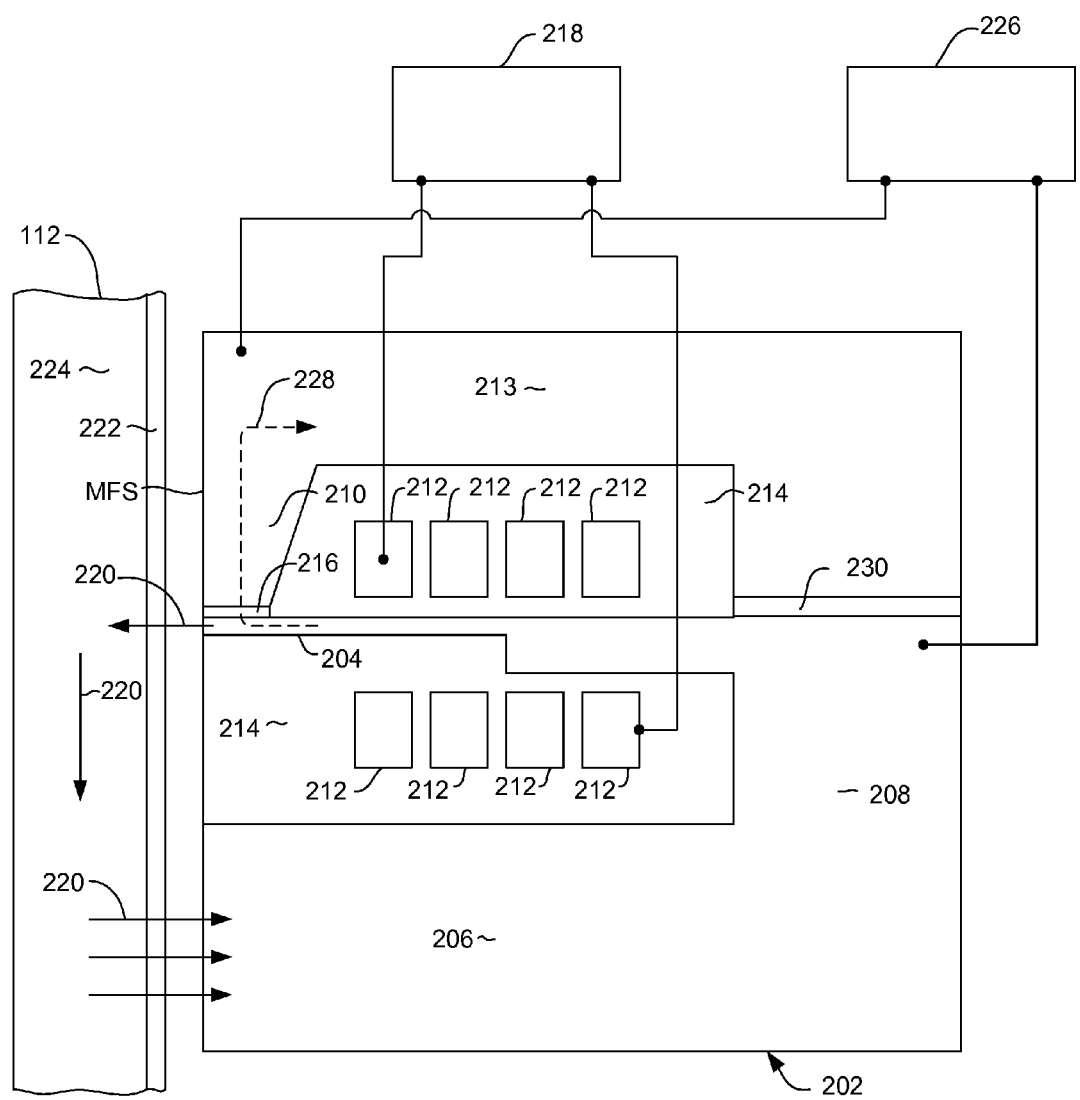
FIG. 2 is a cross sectional, side view of a magnetic write head.

FIG. 2 is a side, cross sectional view of a magnetic write head 202, such as might be used in a microwave assisted magnetic recording (MAMR) system. The write head 202 includes a magnetic write pole 204 that extends to a media facing surface MFS. The write head 202 also includes a magnetic return pole 206 that has a cross section at the media facing surface MFS that is significantly larger than that of the write pole 204. The magnetic write pole 204 and magnetic return pole 206 can be connected with one another at a back end of the write head 202 at a location that is removed from the media facing surface MFS, which can be referred to as a back gap 208. The write head also includes a trailing magnetic shield 210 that can be magnetically coupled with the back portion of the write head 202 by a trailing magnetic return pole 213. One or more non-magnetic, electrically conductive write coils 212 (shown in cross section in FIG. 2) pass through the magnetic write head 202 as shown. The write coils 212 can be embedded in a non-magnetic, electrically insulating material 214 such as alumina and/or hard baked photoresist. A magnetic oscillator, such as a spin torque oscillator 216 is formed between the magnetic write pole 204 and the trailing magnetic shield 210.

Circuitry 218 is connected with the write coil 212 for providing a write current to the write coil 212. When a current flows through the write coil, the resulting magnetic field from the write coil 212 induces the flow of a magnetic flux through the write pole 204. This magnetic flux results in a magnetic write field 220 that travels from the tip of the write pole 204 to the magnetic media 112. The magnetic media 112 has a high anisotropy top magnetic layer 222, and a magnetically softer under-layer 224. The write field 220 locally magnetizes the top layer 222 of the media 112, and then travels through the magnetically soft layer 224 before returning to the magnetic return pole 206. Because the magnetic return pole 206 has a much larger cross section at the media facing surface MFS than does the write pole 204, the magnetic write field 220 returning to the return pole 206 is sufficiently spread out and weak that it does not erase previously recorded signals when passing through the magnetic top layer 222.

As magnetic bits become ever smaller in order to accommodate increased data density requirements, the recorded magnetic bits become inherently unstable, especially at high temperatures. This can be overcome by increasing the magnetic anisotropy of the magnetic recording layer 222. Unfortunately, recording a magnetic bit to such a high anisotropy media requires a stronger write field, a problem that is exacerbated by the smaller write pole size required to write the smaller data bit.

One way to overcome this challenge is through the use of Microwave Assisted Magnetic Recording (MAMR). In a MAMR system, the magnetic oscillator 216, which can be located directly between the write pole 204 and the trailing magnetic shield 210, generates an oscillating magnetic field that can be referred to as a magnetic microwave field. This oscillating magnetic field locally magnetically excites the magnetic top layer 222 of the magnetic media 112, making the media 112 easier to write to by temporarily lowering its magnetic anisotropy.

Circuitry 226 can be connected with the write head 202 such as between the trailing magnetic shield 210 and the back gap layer 208 as shown in order to induce an electrical current through the magnetic oscillator 216. In FIG. 2, this electrical current is indicated by dashed line 228. An electrically insulating layer 230 can be located in the back portion of the write head 202 between the trailing magnetic return pole 213 and back gap 208 in order to prevent shunting of the current 228.

Figure 3:
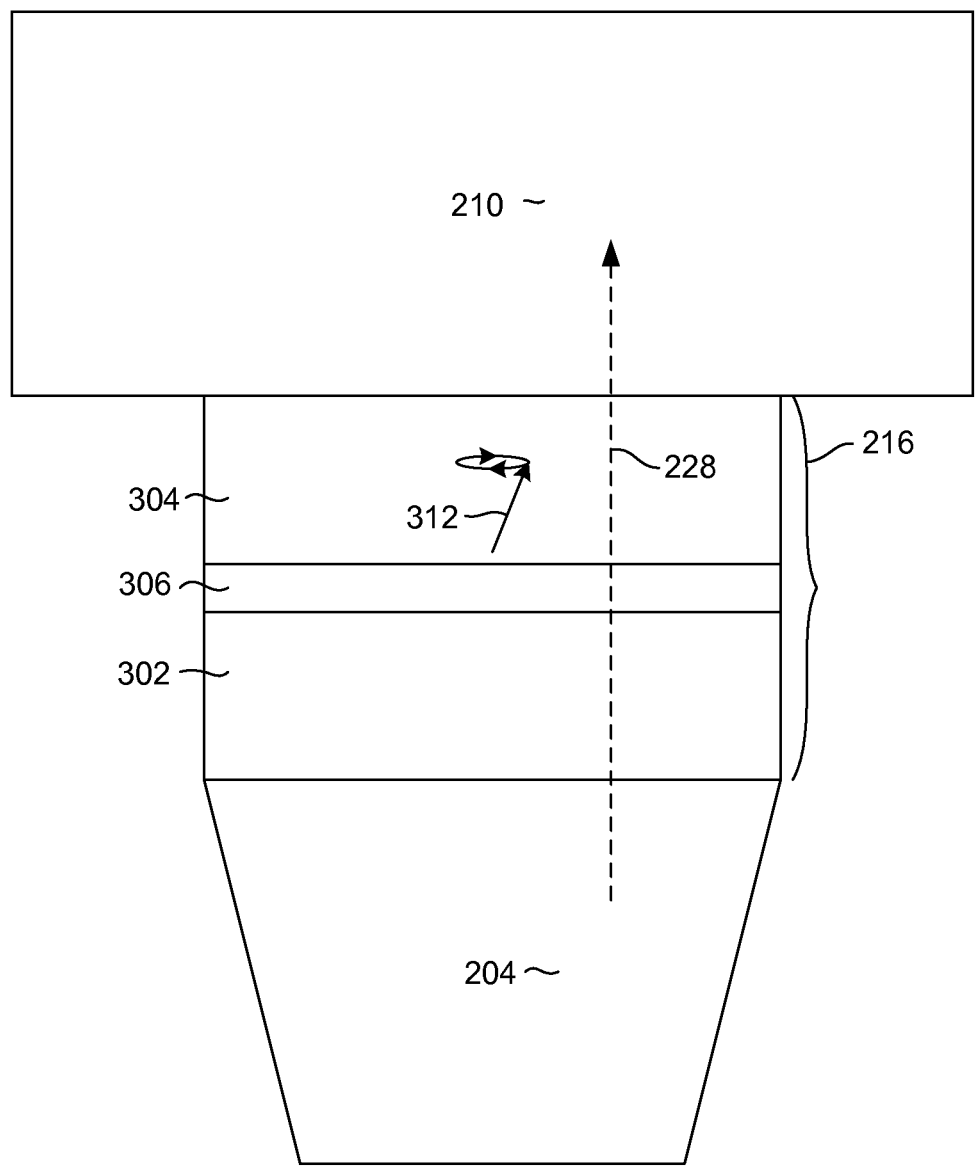
FIG. 3 is a view of a magnetic write pole and magnetic oscillator of the magnetic write head, as seen from a media facing surface.

FIG. 3 shows on example of a magnetic oscillator, which can be referred to as a spin torque oscillator. As shown in FIG. 3, the spin torque oscillator 216 can include a spin injection layer 302, a magnetic oscillation layer 304 a non-magnetic spacer layer 306 sandwiched between the spin injection layer 302 and magnetic oscillation layer 304. The spin injection layer 302 has a magnetization that is fixed in a desired direction, whereas the magnetic oscillation layer 304 has a magnetization 312 that is free to move. When an electrical current 228 passes through the spin torque oscillator 216, electrons passing through the spin injection layer 302 become spin polarized. That is, their electron spins tend to become aligned in the same direction as a result of the fixed magnetization of the spin injection layer 302. These spin polarized electrons then pass through the magnetic oscillation layer 304 where the polarization of the electrons causes the magnetization 312 of the magnetic oscillation layer 304 to oscillate in a precessional fashion as shown in FIG. 3.

One challenge that arises from the use of the magnetic oscillator 216 is that the current 228 used to activate the magnetic oscillator 216 creates a magnetic bias, resulting from electromagnetic fields that inevitably result from the flow of electrical current through an electrical conductor. This magnetic bias can affect the magnetization of the write pole 204. During writing, this magnetic bias is not so much of a problem, because it is overpowered by the magnetic write field resulting from the activation of the write coil 212. However, when writing is terminated and the magnetic oscillator 216 is deactivated, the current 228 does not terminate instantly but actually tapers off as a function of time. Therefore, as the current 228 decreases during degaussing of the write pole, the remnant biasing of from the current 228 can result in a remnant magnetization of the write pole 204 that remains after writing has stopped. This remnant magnetization of the write pole can lead to de-magnetization of previously recorded data and, therefore, to data loss.

Figure 4:
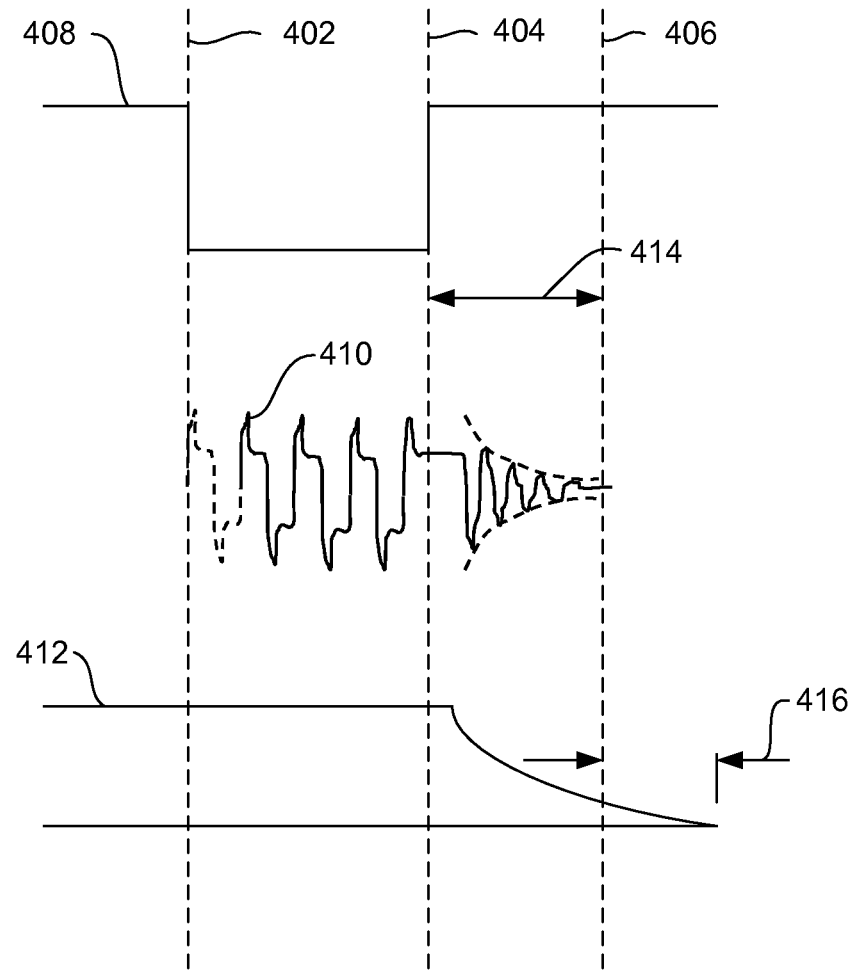
FIG. 4 is a graphical representation showing magnetic write pole degauss relative to magnetic oscillator induced bias decay for a standard microwave assisted magnetic recording system.

FIG. 4 illustrates this effect. In FIG. 4, dashed line 402 indicates a time when writing is activated (e.g. write gate open). Line 404 is the time when writing stops and reading begins (e.g. write gate closed, and switching from write mode to read mode), and line 406 is the time when the degauss of the write pole is complete. Line 408 represents the condition of the write gate (not shown), indicating whether the write head is activated for writing or not. Line 410 is a line indicating the write field produced by the write pole and reflects the magnetic state of the write pole. Line 412 represents the electrical current through the spin torque oscillator.

As can be seen, when the write gate is closed and a write current is no longer delivered to the write coils (212 in FIG. 2), the write field does drop instantaneously, but tapers over time. The time between lines 404, and 406, the duration of which is shown as line 414, indicates time in which the write pole magnetization drops off, referred to as degauss of the write pole. Also, as can be seen in FIG. 4, when the magnetic oscillator is de-activated (time 404), the magnetic bias produced by the flow of current through the magnetic oscillator and write pole does not drop off instantaneously, but tapers over time.

As can be seen, the time for the bias 412 to drop to zero exceeds the degauss time by an amount of time 416. Therefore, biasing from the magnetic oscillator current remains after the write pole has completely lost its magnetization that resulted from the write coil. Because of this, the resulting magnetic bias during the time-frame 416 can DC magnetize the write pole, thereby resulting in erasure of previously written data. This is referred to as pole erasure (PE), and results in loss of data.

Figure 5:
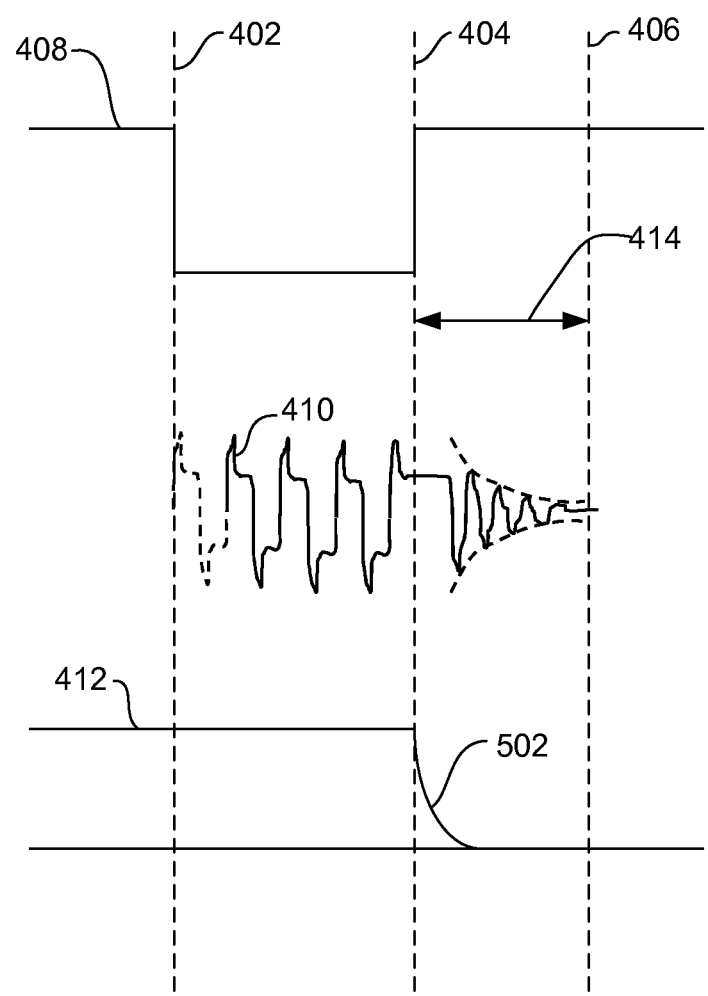
FIG. 5 is a graphical representation showing magnetic write pole degauss relative to magnetic oscillator induced bias decay for an embodiment.

FIG. 5 illustrates a mechanism for overcoming this problem. In FIG. 5, the time to degauss the write pole can remain the same as in the previous example described with reference to FIG. 4. However, the time to bring the magnetic oscillator current induced magnetic bias to zero has been decreased 502. In this case the magnetic oscillator bias reduces to zero before the write pole has completely degaussed. Therefore, there will be no magnetic bias to magnetize the write pole by the time the magnetic signal has died off, thereby avoiding write pole erasure. The reduction of the time to zero bias can be accomplished through the modification of the circuitry 216 (FIG. 2), as will be discussed in greater detail herein below. Alternatively, the current to the magnetic oscillator can simply be terminated prior to the termination of writing. In other words, the magnetic oscillator can simply be switched off earlier.

Figure 6:
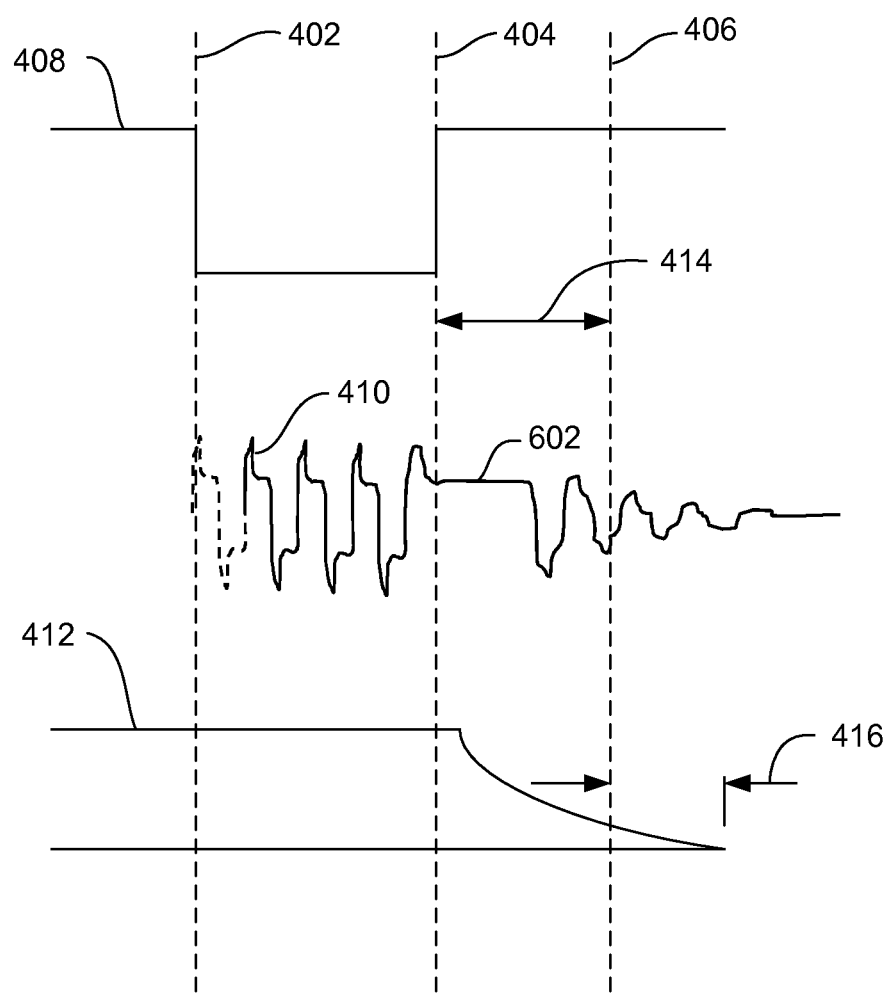
FIG. 6 is a graphical representation showing magnetic write pole degauss relative to magnetic oscillator induced bias decay for another embodiment.

FIG. 6 shows another mechanism for preventing pole erasure. In FIG. 6, the decay time of the bias 412 can remain the same as in FIG. 4. However, the length of time for the degauss of the write pole can be increased so that degauss is complete after the magnetic oscillator bias 412 has completely decayed. One way to accomplish this is to configure the circuitry 218 (FIG. 2) so as provide a given duration of DC magnetic field 602 between the write period and degauss period. In addition, or alternatively, the duration of the alternating current for degauss of the write pole can be increased. As can be seen in FIG. 6, using this method, the degauss does not complete until after the bias 412 from the magnetic oscillator has completely dropped to zero. Therefore, there is no chance for the magnetic bias from the oscillator to magnetize the write pole in such a way as to cause pole erasure.

Figure 7:
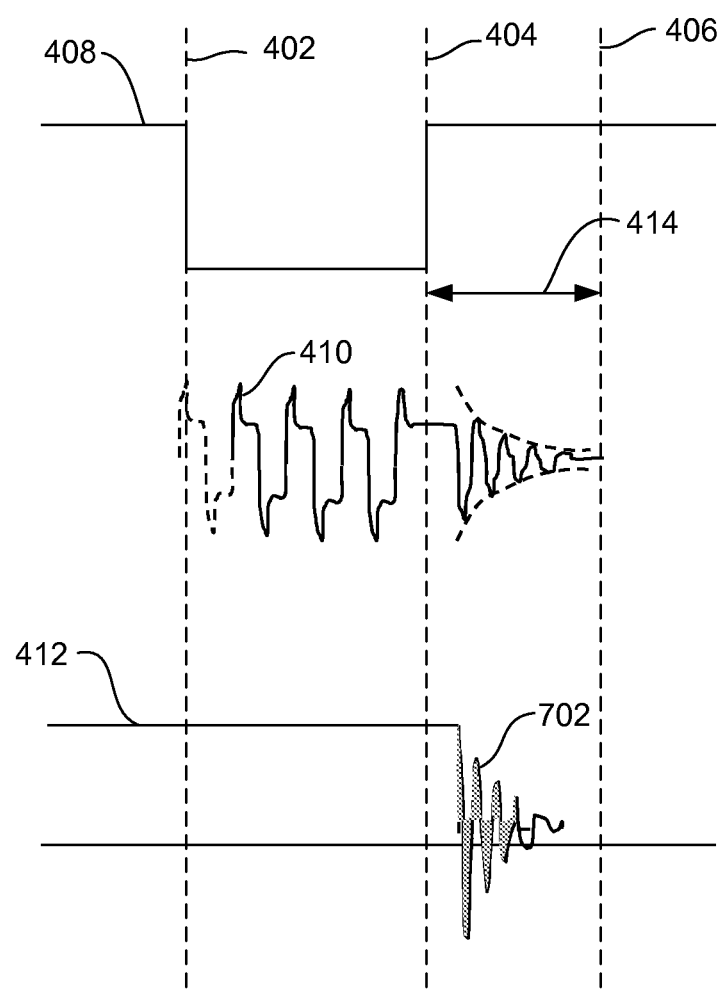
FIG. 7 is a graphical representation showing magnetic write pole degauss relative to magnetic oscillator induced bias decay according to another embodiment.

FIG. 7 shows still another mechanism for avoiding pole erasure. Rather than simply switching off the magnetic oscillator when writing terminates, the circuitry 226 is configured to provide an alternating current 702 for a predetermined duration after the magnetic oscillator has been deactivated. Because an alternating current is flowing through the magnetic oscillator, rather than a DC current, the resulting current does not provide a DC magnetic bias that can magnetize the write pole, thereby preventing pole erasure.

Figure 8:
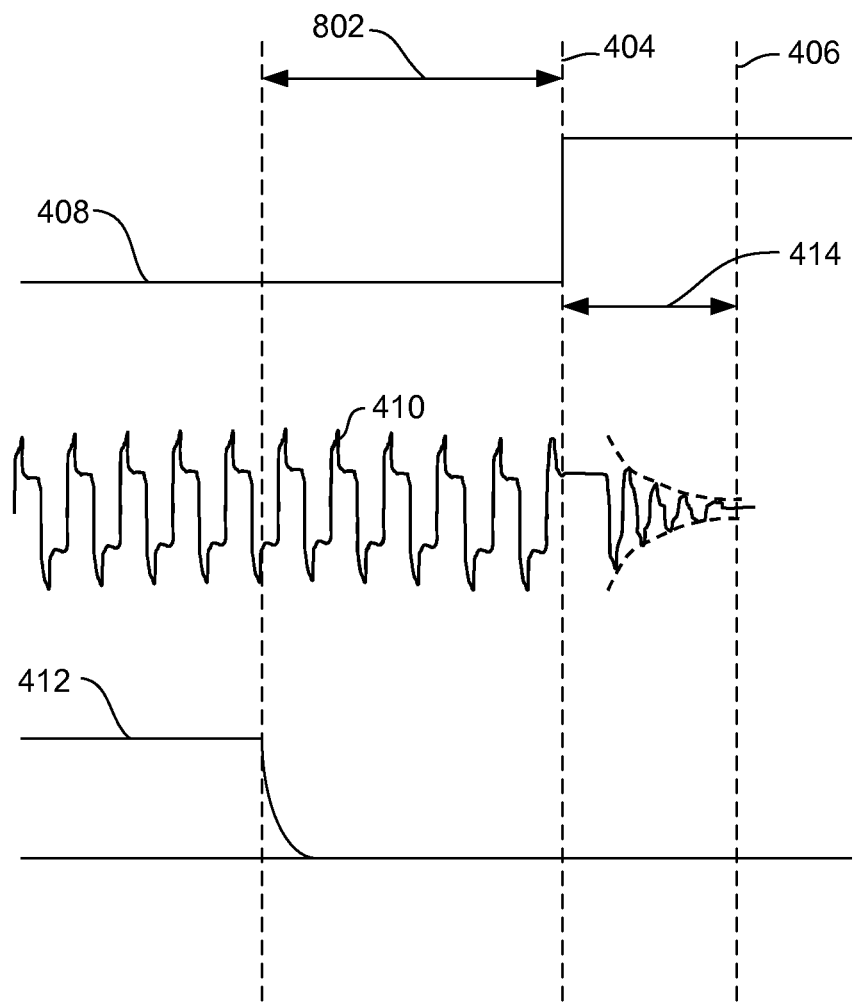
FIG. 8 is a graphical representation showing magnetic write pole degauss relative to magnetic oscillator induced bias decay for an embodiment for ensuring degauss after excessively long write time.
Figure 9:
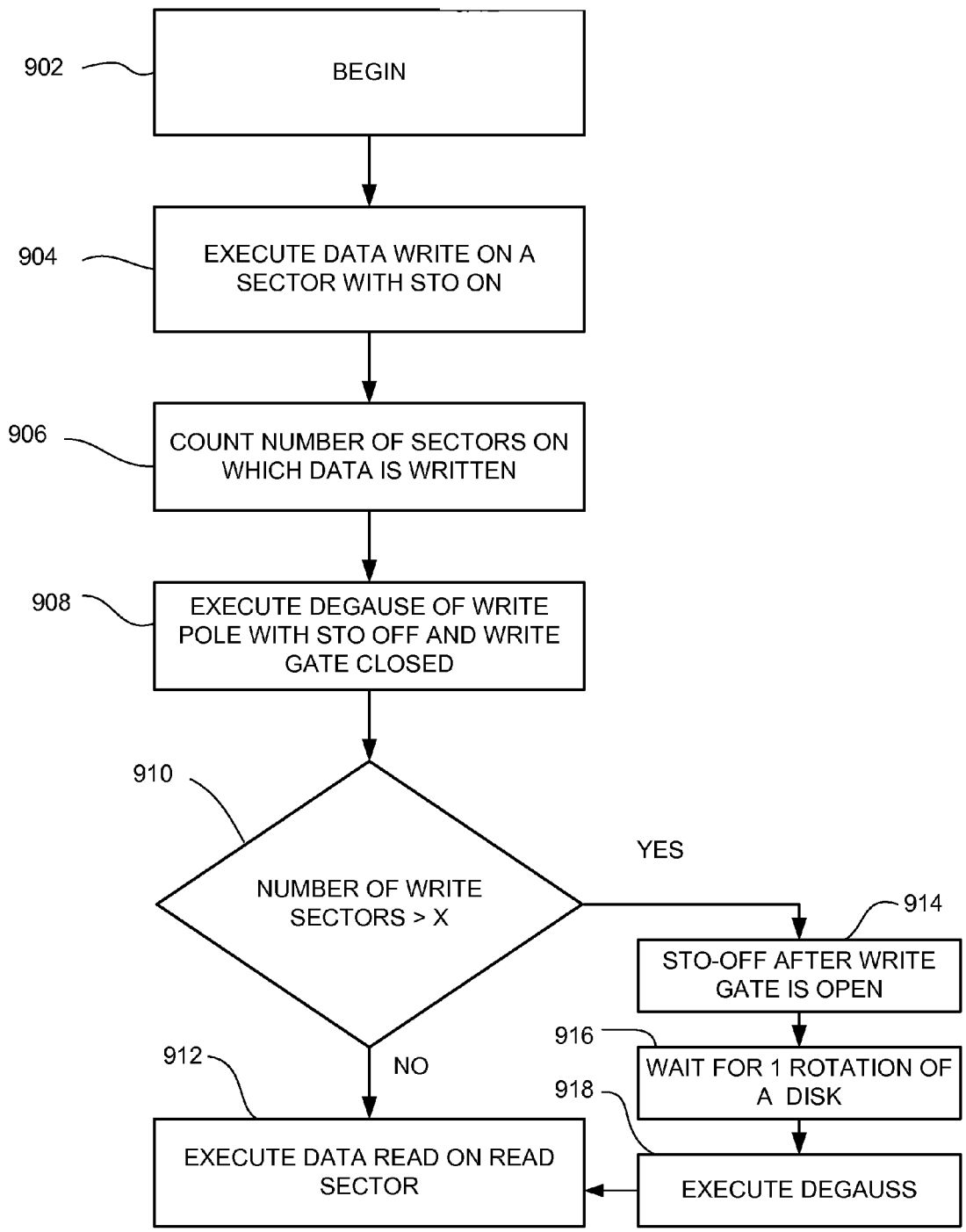
FIG. 9 is a flowchart illustrating a method for ensuring degauss of a magnetic write pole after excessively long writing.

FIGS. 8 and 9 address a solution to another challenge related to pole erasure. When a write cycle has lasted for too long in the presence of the bias from the magnetic oscillator (i.e. greater than an acceptable number of write sectors), the write pole can become excessively magnetized in such a manner that it remains magnetized after writing has stopped. In order to ensure that this does not occur, as shown in FIG. 8, the magnetic oscillator is deactivated a predetermined length of time 802 prior to terminating writing. Preferably, this length of time can be equivalent to about one rotation of magnetic disk, if the magnetic media is a disk.

FIG. 9 illustrates this process in the form of a flowchart. The process begins at step902. Then, in a step 904 a data write is executed with the spin torque oscillator activated. While data write is being performed, the number of sectors on which data is written is counted (step906). When it is time to terminate writing, the write pole degauss is performed and the spin torque oscillator is turned off at step 908. However, in a decision step 910, a determination is made of whether the writing has occurred for greater than a predetermined allowable number of data sectors. If the answer is no, then a data read process can be initiated in step 912. However, if the answer to decision step 910 is yes, then the magnetic oscillator is deactivated with the write gate on (e.g. write pole activated) in a step 914. This state is maintained for a predetermined length of time (preferably about one disk rotation) in a step 916. Then, after the predetermined length of time has passed, a degauss can be executed (step 918) and then the data read can be executed 912.

Figure 10:
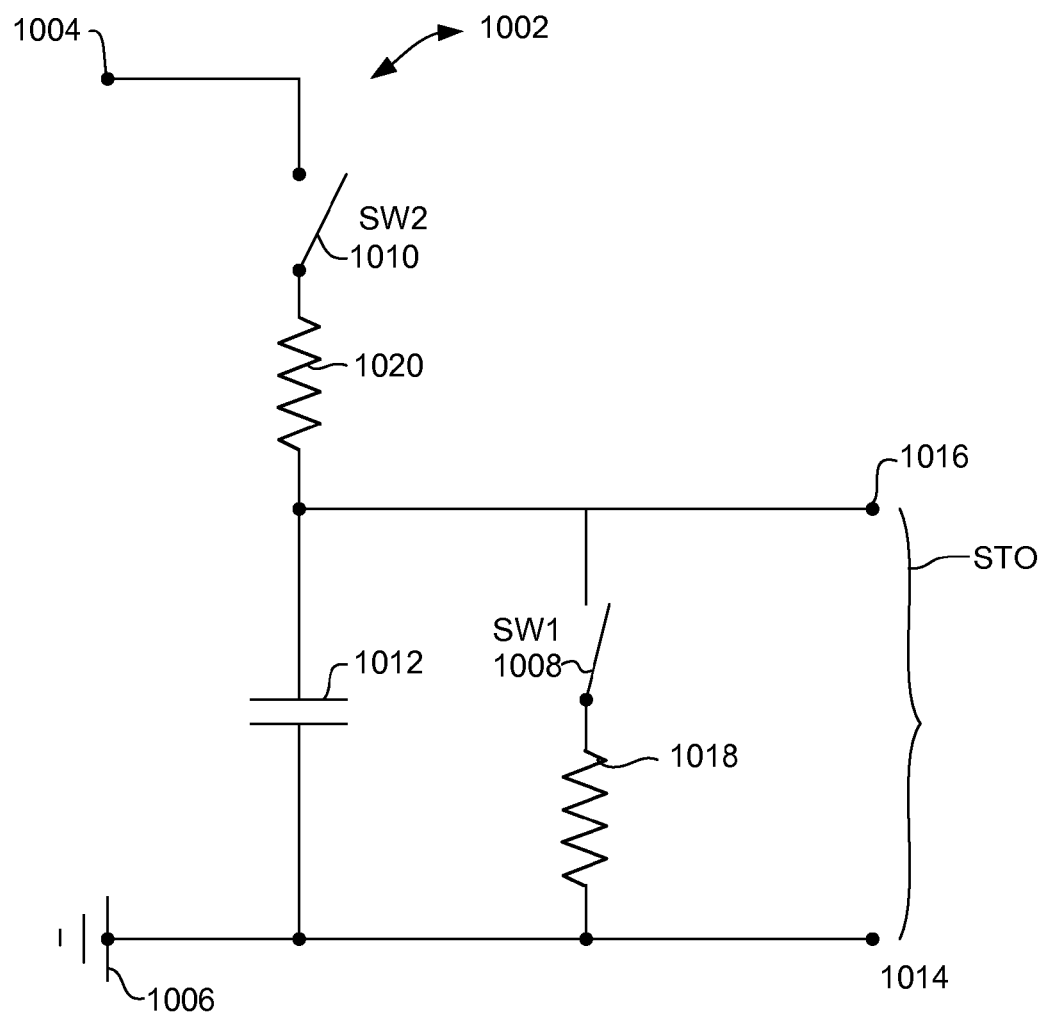
FIG. 10 illustrates circuitry for shortening the fall time of current through a magnetic oscillator.

FIG. 10 is a schematic illustration of possible circuitry 1002 for shortening the fall time of the current through the magnetic oscillator as discussed above with reference to FIG. 5. The circuitry 1002 can correspond to circuitry 226 of FIG. 2. However, the circuitry 226 of FIG. 2 can include other additional circuitry as well. The circuitry 1002 discussed with reference to FIG. 10 includes a voltage potential source 1004 and a ground 1006. The circuitry 1002 also includes output terminal 1014, 1016, for supplying power to the magnetic oscillator 216 (FIG. 2). A first resistor 1018 and capacitor 1012 are connected in parallel across the output terminals 1014, 1016 and the first resistor 1018 and capacitor 1012 are connected in series with a second resistor 1020. The first resistor 1018 can be connected with a first switch 1008 for controlling the flow of current through the first resistor 1018. Similarly, a second switch 1010 can be connected in series with the second resistor 1020.

Figure 11:
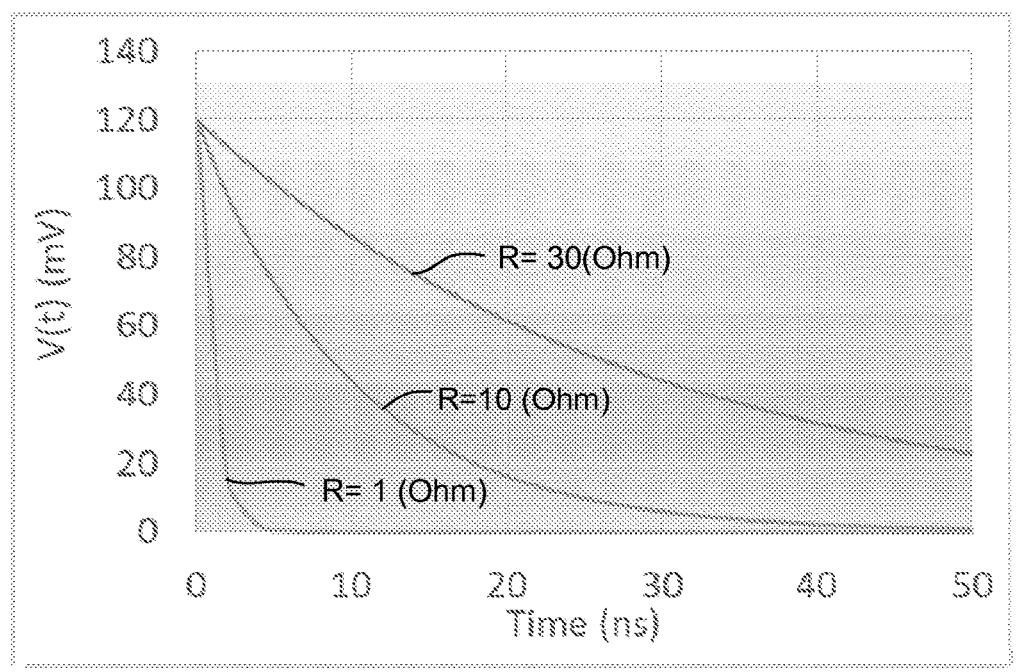
FIG. 11 is a graph illustrating how current fall time is affected by the resistance of a resistor R in circuitry such as that of FIG. 10.

The fall time of current through the magnetic oscillator can be controlled by adjusting the electrical resistance of the first resistor 1018. This is better illustrated with reference to FIG. 11, wherein various curves show how the electrical current through the magnetic oscillator varies with different resistances R of the first resistor 1018 (FIG. 10). It can be seen that the curve becomes steeper (e.g. magnetic oscillator current drops of more quickly) for circuits having a lower resistance R of the first resistor 1018 of FIG. 10. In FIG. 11, the steepest curve is achieved with a resistance R of 1 ohm.

Figure 12:
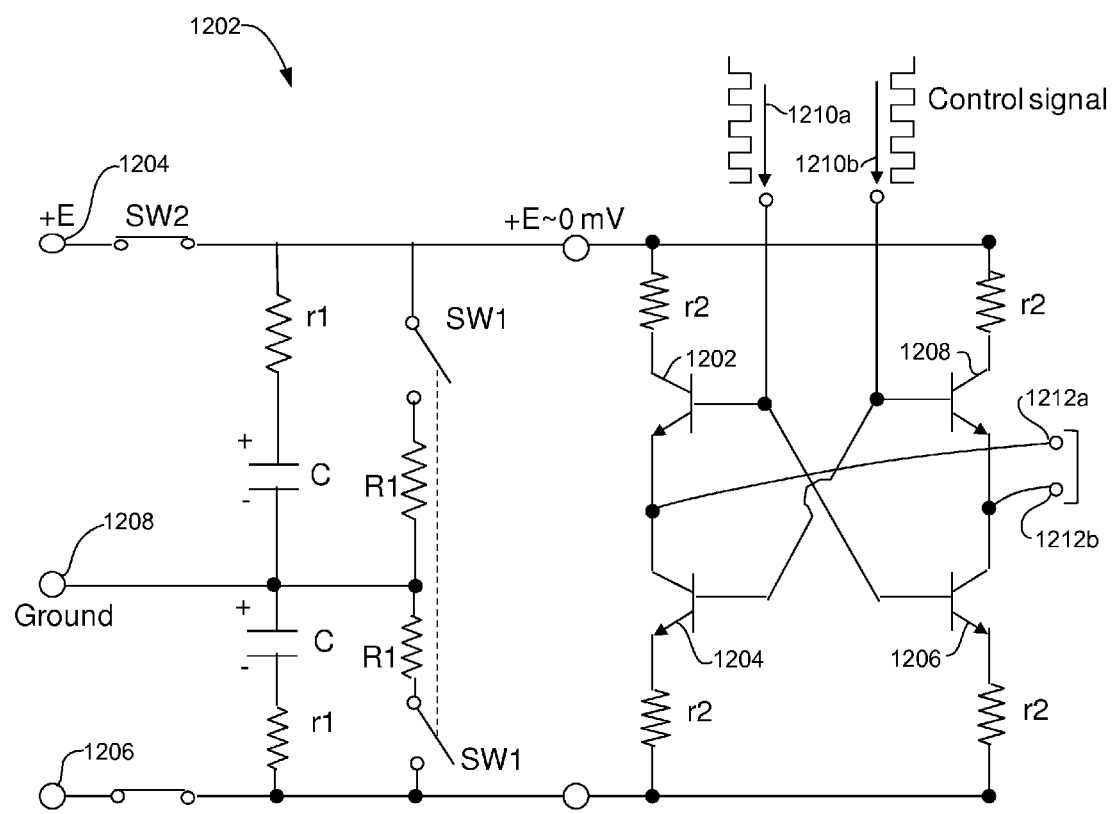
FIG. 12 illustrates circuitry for providing an alternating electrical current through a magnetic oscillator upon shut down of the magnetic oscillator.

FIG. 12 illustrates a possible embodiment for providing a slowly damping alternating current at shut down of the magnetic oscillator as described above with reference to FIG. 7. FIG. 12 shows circuitry 1202 that includes voltage inputs 1204, 1206 and a ground 1208. A control signal can be provided at inputs 1210a and 1210b. Outputs 1212a, 1212b can provide an output signal to a magnetic oscillator. The input from the input terminals 1204, 1206 during normal operation of the spin torque oscillator can be used to provide a DC current to the output terminals 1212a, 1212b to power the magnetic oscillator. However, when the write mode is to be terminated, the control signal provided through terminals 1210a, 1210b can be activated to selectively apply an alternating voltage to transistors 1202, 1204, 1206, 1208 to activate and de-activate the transistors 1202, 1204, 1206, 1208 in order to reverse the direction of current flow in an alternating manner, thereby providing an alternating current to the outputs 1212a, 1212b.

While various embodiments have been described above, it should be understood that they have been presented by way of example only and not limitation. Other embodiments falling within the scope of the invention may also become apparent to those skilled in the art. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic recording system, comprising:
a magnetic write pole;
a magnetic oscillator adjacent to the magnetic write pole, wherein the magnetic oscillator is configured to generate an oscillating magnetic field; and
circuitry connected to the magnetic oscillator to induce a direct current through the magnetic oscillator during operation of the magnetic oscillator and an alternating current through the magnetic oscillator for a predetermined period upon deactivation of the magnetic oscillator.

2. The magnetic recording system of claim 1, wherein the circuitry comprises:
a first transistor and second transistor connected to a first input; and
a third transistor and fourth transistor connected to a second input;
wherein the first transistor, the second transistor, the third transistor, and the fourth transistor are selectively activated and deactivated by a control signal to output either the direct current or the alternating current.

3. The magnetic recording system of claim 2, wherein the control signal comprises a first control signal connected to the first transistor and the fourth transistor and a second control signal connected to the second transistor and the third transistor.

4. The magnetic recording system of claim 3, wherein the first control signal is connected to a base terminal of the first transistor and a base terminal of the fourth transistor, and the second control signal is connected to a base terminal of the second transistor and a base terminal of the third transistor.

5. The magnetic recording system of claim 4, wherein each of the first transistor, the second transistor, the third transistor, and the fourth transistor is an NPN transistor, wherein a collector terminal of the first transistor and a collector terminal of the second transistor are connected to the first input, wherein an emitter terminal of the third transistor and an emitter terminal of the fourth transistor are connected to the second input, and wherein an emitter terminal of the first transistor is connected to a collector terminal of the third transistor and an emitter terminal of the second transistor is connected to a collector terminal of the fourth transistor.

6. The magnetic recording system of claim 1, wherein the magnetic oscillator comprises a spin injection layer, a magnetic oscillation layer, and a non-magnetic spacer layer sandwiched between the spin injection layer and the magnetic oscillation layer, wherein the spin injection layer has a fixed magnetization, and wherein the magnetic oscillation layer has an oscillating magnetization.

7. The magnetic recording system of claim 1, further comprising a magnetic media adjacent to the magnetic write pole, wherein the magnetic media comprises a magnetic top layer, and wherein a magnetic anisotropy of the magnetic top layer is lowered upon excitation by the oscillating magnetic field to facilitate writing on the magnetic media.

8. The magnetic recording system of claim 1, wherein the magnetic oscillator is between the magnetic write pole and a trailing shield of a magnetic write head.

9. The magnetic recording system of claim 1, wherein the alternating current is a damping alternating current.

* * * * *